United States Patent [19]

Buter et al.

[11] Patent Number: 5,190,994

[45] Date of Patent: Mar. 2, 1993

[54] AQUEOUS DISPERSIONS OF HYBRID POLYMERS AND COATING COMPOSITIONS CONTAINING SAME

[75] Inventors: Roelof Buter, Dieren; Andreas H. J. Roelofs; Aletta Wemmenhove, both of Arnhem, all of Netherlands

[73] Assignee: Akzo N.V., Arnhem, Netherlands

[21] Appl. No.: 661,712

[22] Filed: Feb. 27, 1991

[30] Foreign Application Priority Data

Mar. 6, 1990 [EP] European Pat. Off. ........ 90200518.0

[51] Int. Cl.$^5$ .............................................. C08L 51/08
[52] U.S. Cl. .................... 523/407; 523/201; 525/115; 525/119
[58] Field of Search ............... 523/201, 407; 525/902, 525/115, 119

[56] References Cited

U.S. PATENT DOCUMENTS

| | | | |
|---|---|---|---|
| 3,878,139 | 4/1975 | Takahashi et al. | 260/17 A |
| 3,932,562 | 1/1976 | Takahashi | 260/873 |
| 4,025,471 | 5/1977 | Takahashi | 260/16 |
| 4,028,294 | 6/1977 | Brown et al. | 260/29.6 NR |
| 4,116,901 | 9/1978 | Sekmakas et al. | 260/19 UA |
| 4,151,131 | 4/1979 | Sekmakas et al. | 260/19 EP |
| 4,212,776 | 7/1980 | Martinez et al. | 260/18 EP |
| 4,212,781 | 7/1980 | Evans et al. | 260/29.4 UA |
| 4,234,466 | 11/1980 | Takahashi et al. | 260/17 A |
| 4,245,074 | 1/1981 | Buter | 526/214 |
| 4,285,847 | 8/1981 | Tiag | 260/29.2 EP |
| 4,297,261 | 10/1981 | Jozwiak, Jr. | 260/29.7 RP |
| 4,303,565 | 12/1981 | Tobias | 260/23 CP |
| 4,308,185 | 12/1981 | Evans et al. | 260/29.2 EP |
| 4,443,568 | 4/1984 | Woo | 523/406 |
| 4,465,816 | 8/1984 | Lindert | 525/488 |
| 4,522,962 | 6/1985 | Abbey et al. | 523/410 |
| 4,564,648 | 1/1986 | Huybrechts et al. | 523/423 |
| 4,894,397 | 1/1990 | Morgan et al. | 523/201 |

FOREIGN PATENT DOCUMENTS

| | | |
|---|---|---|
| 854523 | 5/1977 | Belgium . |
| 000601 | 8/1981 | European Pat. Off. . |
| 0116225 | 8/1984 | European Pat. Off. . |
| 0287144 | 10/1988 | European Pat. Off. . |
| 2304680Q | 1/1972 | Fed. Rep. of Germany . |
| 63-309516 | 12/1987 | Japan . |

OTHER PUBLICATIONS

Ronald S. Bauer, "Recent Developments in Water Borne Epoxy Resins", Journal of Waterborne Coatings, vol. 5, (1982), pp. 5-17.

Primary Examiner—Melvyn I. Marquis
Assistant Examiner—David Aylward
Attorney, Agent, or Firm—James K. Poole; Bart Lerman; Louis A. Morris

[57] ABSTRACT

A water-dispersible hybrid polymer of a core/shell structure is provided which is based upon (A) a polymer (core) of a mercapto-functionalized poly(epoxyester) onto which (B) at least one addition polymer-based chain (shell) has been grafted via the addition polymerization of free-radically polymerizable monomers in the presence of the mercapto-functionalized poly(epoxyester). Also provided are aqueous dispersions of these hybrid polymers and coating compositions therefrom, which coating compositions are especially suited for use as clearcoats and surfacers.

23 Claims, No Drawings

AQUEOUS DISPERSIONS OF HYBRID POLYMERS AND COATING COMPOSITIONS CONTAINING SAME

The present application for patent is entitled to the benefit of an earlier filing date in a foreign country under 35 U.S.C. 119, based on European priority application Ser. No. 90200518.0, The Netherlands, Apr. 15, 1988, which is hereby incorporated by reference

BACKGROUND OF THE INVENTION

1. Field of the Invention

The present invention relates generally to a water-dispersible hybrid polymer of a core/shell structure, which comprises (A) a polymer (core) onto which (B) at least one addition polymer-based chain (shell) has been grafted. The present invention also relates generally to aqueous dispersions of these hybrid polymers and coating compostions based thereon, which coating compositions are especially suitable for use as primers/surfacers, clear coatings and pigmented coatings.

2. Description of Background Art

Hybrid polymers comprising a polymer backbone onto which at least one addition polymer-based chain has been grafted are, in a general sense, known in the art, as is their use in coating compositions. See, for example, DE-A-2304680, U.S. Pat. No. 3,932,562 and U.S. Pat. No. 4,025,471.

Aqueous versions of such coating compositions are also known. See, for example, BE 854523, EP-A-0116225, EP-A-287144, U.S. Pat. No. 4,028,294, U.S. Pat. No. 4,116,901, U.S. Pat. No. 4,212,776, U.S. Pat. No. 4,212,781, U.S. Pat. No. 4,285,847, U.S. Pat. No. 4,297,261, U.S. Pat. No. 4,308,185, U.S. Pat. No. 4,443,568, U.S. Pat. No. 4,564,648, JP-A-63309516 and Bauer, Ronald S., "Recent Developments in Water Borne Epoxy Resins," *Journal of Waterborne Coatings,* Vol 5 (1982), pp. 5–17.

SUMMARY OF THE INVENTION

A particular type of such hybrid polymer has now been discovered which, when dispersed in an aqueous medium, produces stable dispersions with relatively low viscosities even at concentrations of 50 percent by weight and higher. The hybrid polymers themselves possess a relatively low acid number which is comparable to those of polymers used in organic solvents.

Further, aqueous coating compositions based upon these aqueous dispersions may be formulated at quite high solids contents, and films produced from these coating compositions display a good combination of physical and mechanical properties as well as good chemicial and water resistance.

Such advantageous hybrid polymers, aqueous dispersions and coating compositions thereof are neither specifically known from nor suggested by the aforementioned prior art.

In accordance with the present invention, there is provided a hybrid polymer which comprises
(A) a polymer (core) comprising a mercapto-functionalized poly(epoxyester), which is the reaction product of
 (1) an epoxy-terminated poly(epoxyester) and
 (2) a compound containing
  (a) a primary mercapto group and
  (b) a group more reactive with an epoxy group than is a primary mercapto group;
onto which has been grafted, via the addition polymerization of free-radically polymerizable monomers in the presence of the mercapto-functionalized poly(epoxyester),
(B) at least one addition polymer-based chain (shell), the addition polymer-based chain having an acid number of from about 20 to about 100.

It is preferred that the hybrid polymer should comprise
(A) from about 40 weight percent to about 90 wt % of the polymer (core) and
(B) from about 10 weight percent to about 60 weight percent of the addition polymer-based chains (shell), based upon the total weight of the hybrid polymer. Within these boundaries it has been found that the hybrid polymers possess the best mixture of advantageous properties from the individual components. Advantageous properties of poly(epoxyesters) include, for example, good adhesion to many substrates, good mechanical resistance and a good balance of hardness and flexibility. Advantageous properties of addition polymers include, for example, good chemical resistance.

The hybrid polymers in accordance with the present invention are readily water dispersible upon at least partial neutralization of the acid groups of the addition polymer-based chains (B). Aqueous dispersions of such are produced by at least partially neutralizing the acid groups and dispersing the so-neutralized hybrid polymers in an aqueous medium.

The aqueous dispersions of the hybrid polymers in accordance with the present invention are suitable for a variety of uses but especially as aqueous coating compositions. Preferred fields of application include clear coatings, pigmented coatings and primers/surfacers.

These and other features and advantages of the present invention will be more readily understood by those skilled in the art from a reading of the following detailed description with reference to the specific examples contained therein.

DETAILED DESCRIPTION OF THE PREFERRED EMBODIMENTS

As indicated earlier, the present invention concerns a particular hybrid polymer, aqueous dispersion of such hybrid polymer and coating composition based thereon.

The hybrid polymer, in its overall concept, comprises (A) a polymer (core) onto which has been grafted (B) at least one addition polymer-based chain (shell) via the addition polymerization of free-radically polymerizable monomers in the presence of the polymer (core). The hybrid polymer preferably consists essentially of the core (A) and shell (B) and can consist exclusively of these components.

The polymer (A) comprises a mercapto-functionalized poly(epoxyester) which is the reaction product of
1) an epoxy-terminated poly(epoxyester) and
2) a compound containing
 (a) a primary mercapto group and
 (b) a functional group more reactive with an epoxy group than is a primary mercapto group.

The epoxy-terminated poly(epoxyester) preferably is the reaction product of
n moles of a bisepoxide having a number average molecular weight (Mn) in the range of from about 150 to about 2000, and
n−1 moles of dicarboxylic acid having 4–40 carbons atoms, wherein n=2–10.

The Mn of the resulting poly(epoxyester) should preferably range from about 400 to about 20000.

As suitable bisepoxides may be mentioned a wide variety of aliphatic, aromatic, araliphatic and cycloaliphatic bisepoxides as well as mixtures thereof. A number of suitable specific examples may be found by reference to Epoxy Resins—Chemistry and Technology, 2d ed., Dekker Inc, New York (1988), pages 212-31, which is specifically incorporated by reference herein for all purposes.

As preferred examples may be mentioned the diglycidyl ethers of bisphenol A; epoxy oligomers from epichlorohydrin and bisphenol A having oxirane end groups and an Mn in the range of about 300 to about 2000; 1,3-bis(2,3-epoxyprop-1-oxy) benzene; 1,4-butanediol diglycidyl ether; a diglycidyl ether of polypropylene glycol; a diglycidyl ether of dimerized linoleic acid; epoxydicyclopentyl phenyl glycidyl ether; bis(2,3-epoxycyclopentyl) ether; bis(2,3-epoxy-6-methylcyclohexylmethyl) adipate; 3,4-epoxycyclohexylmethyl-3,4-epoxycyclohexane carboxylate and dicyclopentadiene dioxide. Especially preferred of these are the aforementioned diglycidyl ethers of bisphenol A, and epoxy oligomers from epichlorohydrin and bisphenol A.

As examples of preferred dicarboxylic acids having from 4-40 carbon atoms may be mentioned adipic acid, isophthalic acid, phthalic acid, napthalene-2,6-dicarboxylic acid, hexahydrophthalic acid, succinic acid, sebacic acid, dodecane dicarboxylic acid, azaleic acid and dimerized fatty acids. Especially preferred are those having from 10 to 40 carbon atoms, particularly the dimerized fatty acids containing from 18 to 36 carbon atoms.

The epoxy-terminated poly(epoxyester) is mercapto-functionalized via the reaction of at least a portion of the epoxy groups with a compound containing a primary mercapto group and a functional group which is more reactive with an epoxy group than is a primary mercapto group. Preferred of these compounds may be mentioned those represented by the general formula (I):

$$\text{HS—R—X} \tag{I}$$

R in formula (I) represents a hydrocarbon group having from 1 to 24 carbon atoms, more preferably an alkylene group having from 1 to 11 carbon atoms, and especially an alkylene group having from 1 to 4 carbon atoms. X in formula (I) represents the other functional group, which is preferably a carboxyl or amino group, most preferably a carboxyl group.

Especially preferred are mercaptomonocarboxylic acids. As particularly preferred examples may be mentioned mercaptoacetic acid, mercaptopropionio acid and mercaptovalerio acid.

A portion of the primary mercapto group-containing compound may be replaced with a monofuctional compound of the general formula (II):

$$R_1\text{—}X_1 \tag{II}$$

$R_1$ in formula (II) represents a hydrocarbon group having from 1 to 40 carbon atoms, more preferably an alkyl, aralkyl, aryl or cycloalkyl group having from 1 to 24 carbon atoms. $X_1$ represents a functional group which is more reactive with an epoxy group than is a primary mercapto group, preferably an amino or carboxyl group, and especially a carboxyl group.

Especially preferred are the monocarboxylic acids. As suitable mono-carboxylic acids may be mentioned a wide variety of aromatic, araliphatic, aliphatic and cycloaliphatic monocarboxylic acids, preferably with from 2 to 24 carbon atoms. As particularly preferred examples may be mentioned pivalic acid, propionic acid, benzoic acid and stearic acid.

The primary mercapto group-containing compound should be reacted with the epoxy-terminated poly(epoxyester) in an equivalence ratio of X groups to epoxy groups of at least about 1:4, preferably at least about 1:2. The combination of the primary mercapto group-containing compound and monofunctional compound is utilized in an equivalence ratio of $X+X_1$ groups to epoxy groups of from about 1:4 to 1:1, preferably 1:2 to 1:1, and especially 1:1 (stoichiometric) so as to result in essentially no residual epoxy functionality.

The mercapto-functionalized poly(epoxyester) may be produced in a conventional manner by reacting the bisepoxide, dicarboxylic acid, primary mercapto group-containing compound and optional monofunctional compound in the amounts described above.

Preferably, the reaction should take place in an organic solvent (10-30 weight percent) at a temperature of between about 60° C. and about 200° C. The organic solvent for the reaction should be water miscible. As suitable examples may be mentioned glycol ethers and propylene glycol ethers, such as methoxypropanol, butoxyethanol, isopropoxypropanol, propoxypropanol, diethylene glycol dimethyl ether and N-methyl pyrrolidone. Small amounts of non-water miscible organic solvents may also be utilized, such as ethyl methyl ketone and methyl isobutyl ketone.

A catalyst may also be utilized for the reaction between the epoxy groups, and the carboxyl and other functional groups. As suitable examples may be mentioned acid catalysts such as p-toluene sulfonic acid; basic amine, ammonium and phosphonium catalysts such as tetramethylammonium chloride, benzyltrimethylammonium methoxide and triphenylbenzyl phosphonium chloride; and other well-known catalysts such as Cr(III)-2-ethylhexanoate, zinc chloride and zinc acetylacetonate.

The hybrid polymer is formed via the addition polymerization of free-radically polymerizable monomers in the presence of the above described mercapto-functionalized poly(epoxyester). It is believed that the mercapto groups thereof act as chain transfer agents, resulting in the grafting of one or more addition polymer-based chains onto the core polymer.

A wide variety of free-radically polymerizable monomers are suitable for use in producing the addition polymer-based chains. As specific examples may be mentioned ethylenically unsaturated monocarboxylic acids, such as (meth)acrylic acid and crotonic acid; (cyclo)alkyl (meth)acrylates with 1-12 carbon atoms in the (cyclo)alkyl group, such as methyl (meth)acrylate, ethyl (meth)acrylate, propyl (meth)acrylate, isopropyl (meth)acrylate, butyl(meth)acrylate, 2-ethylhexyl (meth)acrylate, octyl (meth)acrylate, isobornyl (meth)acrylate, dodecyl (meth)acrylate and cyclohexyl (meth)acrylate; dicarboxylic acids such as maleic acid (and anhydride), fumaric acid and itaconic acid (and anhydride); the (cyclo)alkyl esters of such dicarboxylic acids with 1-12 carbonatoms in the (cyclo)alkyl groups, such as dimethyl maleate, diethyl maleate, diethyl fumarate, dipropyl maleate, dibutylmaleate, dibutyl fumarate, 2-ethylhexyl maleate, 2-ethylhexyl fumarate, octyl maleate, isobornyl maleate, dodecyl maleate and cyclohexyl maleate; (meth)acrylates with ether groups, such as 2-methoxy-ethyl methacrylate, 2-ethoxy-ethyl methacrylate and 3-methoxy-propyl methacrylate; hydroxyalkyl (meth)acrylates, such as 2-hydroxyethyl (meth)acrylate, 2-hydroxypropyl (meth)acrylate, 4-hydroxybutyl acrylate, 6-hydroxyhexyl acrylate, p-hydroxycyclohexyl (meth)acrylate, hydroxypolyethyleneglycol (meth)acrylates, hydroxypolypropyleneglycol methacrylates and the alkoxy derivatives thereof; monovinyl aromatic compounds, such as styrene, vinyltoluene, α-methylstyrene and vinylnapthalene; other substituted (meth)acrylic compounds, such as (meth)acrylamide, (meth)acrylonitrile, N-methylol(meth)acrylamide and N-alkyl (meth)acrylamides; and other monounsaturated compounds such as vinyl chloride, vinyl acetate, vinyl propionate and vinyl pyrrolidines.

Especially preferred monomer mixtures for use in producing the addition polymer-based chains are those disclosed in EP-B-0000601 (U.S. Pat. No. 4,245,074), which is incorporated by reference herein for all purposes. As a first specific example may be mentioned the following monomer mixture:

35-55 mol % of styrene and/or α-methylstyrene;
20-50 mol % of a compound of the general formula (III):

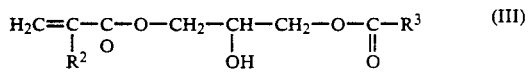

wherein
R$^2$ is an H atom or a methyl group, and
R$^3$ is an alkyl group with 4-10 carbon atoms; and
0-30 mol % of one or more other free-radically polymerizable monomers, such as described above.

As a second specific example may be mentioned the following monomer mixture:

35-55 mol % of styrene and/or α-methyl styrene;
20-50 mol % of acrylic acid and/or methacrylic acid; and
0-30 mol % of one or more other free-radically polymerizable monomers, such as described above,
wherein the reaction product during or after the polymerization is reacted with a glycidyl ester of a carboxylic acid, having the general formula (IV):

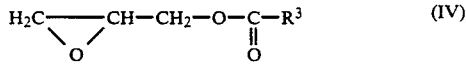

wherein R$^3$ is as defined above.

In the above descriptions of the compounds of formulas III and IV the abbreviation "and/or" is used in its usual sense to indicate that either or both of the components described can be present.

The particular monomers and/or monomer mixtures should be chosen in a manner and in an amount so as to result in an addition polymer-based chain having an acid number of between about 20 and about 100 (mg KOH/g). It has been generally found that stable dispersions cannot readily be produced when the acid number of the addition polymer-based chains is below about 20, and when the acid number is above about 100 the water-resistance becomes unacceptable. It is especially preferred that the acid number should be in the range of from about 30 to about 80.

The monomers and/or monomer mixtures should also be chosen in a manner and in an amount so as to result in the hybrid polymer comprising:
(A) from about 40 weight percent to about 90 weight percent of the polymer (core) and
(B) from about 10 weight percent to about 60 weight percent of the addition polymer-based chains (shell), based upon the total weight of the hybrid polymer. As mentioned earlier, within these boundaries it has been found that the hybrid polymers possess the best mixture of advantageous properties from the individual components.

Of course, the particular choice of monomers and/or monomer mixtures will also depend on a wide variety of other factors such as, for example, the particular end use of the hybrid polymer. These and other factors will be appreciated by one skilled in the art, who can further adjust the choice of monomers accordingly.

The copolymerization of the free-radically polymerizable monomers in the presence of the mercapto-functionalized poly(epoxyester) is in general conducted under an inert (e.g., nitrogen) atmosphere and in the presence of a radical initiator. The polymerization temperature may generally range from about 60° C. to about 200° C., and preferably from about 100° C. to about 160° C.

As suitable radical initiators may be mentioned dibenzoyl peroxide, dicumyl peroxide, methyl ethyl ketone peroxide, cumene hydroperoxide, tert-butyloxy-2-ethylhexanoate, tert-butylperbenzoate, tert-butylcumylperoxide, di-tert-butylperoxy-3,5,5-trimethylcyclohexane, 1,3-bis(tert-butyl)peroxyisopropylbenzene and azobisisobutyronitrile. Mixtures of the above are also suitable. In general the radical initiators are utilized in amounts of from about 0.05 weight percent to about 10 weight percent, and preferably from about 1 weight percent to about 5 weight percent, based upon the total weight of the monomer mixture.

The so-produced hybrid polymers are readily dispersible in an aqueous medium upon at least partial neutralization of the carboxyl groups of the addition polymer-based chains. Suitable neutralizing agents for carboxyl groups include a wide variety of organic and inorganic bases, for example, tertiary amines. The preferred degree of neutralization ranges from about 50 percent to about 130 percent on an equivalent basis.

After neutralization, the hybrid polymers may readily be dispersed in an aqueous medium by conventional means, preferably at elevated temperatures from about 50° C. to about 100° C. When hybrid polymers according to the present invention are utilized, in many cases stable aqueous dispersions of 50 weight percent and even higher may be produced.

Typically, the aqueous dispersions in accordance with the present invention will comprise a solids content of from about 30 weight percent to about 60 weight percent, and preferably in the range of from about 35 weight percent to about 55 weight percent.

As indicated earlier, a preferred use of these aqueous dispersions is in the formulation of coating compositions. When so utilized, the coating compositions may also contain a curing agent for the hydroxyl groups of the hybrid polymer.

As suitable hydroxyl group-reactive curing agents may generally be mentioned N-methylol and/or N-methylol ether containing animoplasts. Especially favorable results can be obtained by using a methylol melamine having 4-6 methylol groups per molecule, with at least three of the methylol groups being etherified with methanol, butanol and/or a methanol or butanol condensation product of formaldehyde and N,N'-ethylene diurea. Other suitable curing agents include water dispersible blocked isocyanates, such as those blocked with methyl ethyl ketoxime, and isocyanate group-containing adducts of a polyisocyanate and a hydroxycarboxylic acid, for instance, dimethylolpropionic acid.

The curing agents reacting with the hydroxyl groups are generally utilized in amounts such that the ratio of the hydroxyl groups of the hybrid polymer to the reactive groups of the curing agent is in the range of from about 0.7 to about 1.5.

Depending upon the field of application, the coating compositions may also contain a variety of other additives common to the paint industry such as pigments, coloring agents, pigment dispersing agents, and thixotropic and other rheological agents. The coating may, if desired, also contain accelerators for the curing reaction, for example, acid compounds such as p-toluene sulfonic acid and blocked derivatives thereof.

The coating compositions may be applied onto any number of well-known substrates such as wood, synthetic materials and metals. Suitable application methods include rolling, spraying, brushing, sprinkling, dipping and electrostatic spraying.

The coating compositions may be dried and cured under a variety of conditions, for example, at ambient temperatures. Accelerated curing may also be accomplished by baking at elevated temperature of generally from 100° C. to 160° C. for from 20 to 60 minutes.

As mentioned earlier, these coating compositions are suitable for use in a wide variety of applications. They are, however, especially suited for use as surfacers and clear coats.

The foregoing more general discussion of the present invention will be further illustrated by the following specific examples.

EXAMPLES

Preparation of Dispersions

In the following Examples 1–23, a number of stable aqueous polymer dispersions were prepared in accordance with the present invention. Various properties of these dispersions were measured, and the results are present below in Table I.

In these examples, the mean particle size of the dispersions was determined by dynamic light scattering, the dispersions being diluted with water to a solids content of about 0.1 percent by weight.

The viscosity of the dispersions was determined with a Brookfield viscometer.

The solids content of the dispersions was determined in accordance with ASTM method 1644-59, with heating at 130° C. over a period of 30 minutes.

EXAMPLE 1

In a 2 liter reaction flask fitted with a stirrer, a thermometer, a reflux condenser and a dropping funnel were homogenously mixed:
132.3 g of a dimerized fatty acid (commercially available under the trade designation Pripol 1009 from Unilever), 100.6 g of a diglycidyl ether of bisphenol A (commercially available under the trade designation Epikote 828 from Shell),
8.2 g of 3-mercaptopropionic acid,
82.9 g of 1-methoxy propanol-2 and
0.3 g of Cr(III) 2-ethylhexanoate.

The dropping funnel was filled with a homogenous mixture of:
34.5 g of acrylic acid,
49.8 g of styrene,
71.9 g of the glycidyl ester of 1,1-dimethyl-1-heptane carboxylic acid (commercially available under the trade designation Cardura E from Shell) and
2.4 g of dicumyl peroxide.

After ventilating, the reaction flask and dropping funnel were brought under a nitrogen atmosphere. The contents of the reaction flask were then heated to 140° C. and maintained at that temperature for 3 hours, after which the contents of the dropping funnel were added and the reaction mixture temperature maintained at 140° C. for another three hours.

The contents of the reaction flask were then cooled to 95° C. and 17.1 g of dimethylethanolamine added after which, over a period of two hours, 552 g of demineralized water were also added.

EXAMPLE 2

Example 1 was repeated in its entirety except for the following.

In the reaction flask were homogenously mixed:
115.0 g of the dimerized fatty acid,
112.5 g of the epoxy resin,
21.2 g of 3-mercaptopropionic acid,
46.0 g of 1-methoxy propanol-2 and
0.3 g of Cr(III) 2-ethylhexanoate.

The dropping funnel was filled with a homogenous mixture of:
36.0 g of acrylic acid,
52.0 g of styrene,
75.0 g of the glycidyl ester,
1.8 g of dicumyl peroxide and
27.0 g of 1-methoxy propanol-2.

After the cooling of the contents of the reaction flask to 95° C., 17.8 g of dimethylethanolamine were added after which, over a period of two hours, 529 g of demineralized water were also added.

EXAMPLE 3

Example 1 was repeated in its entirety except for the following.

In the reaction flask were homogenously mixed:
142.7 g of the dimerized fatty acid,
108.5 g of the epoxy resin,
8.8 g of 3-mercaptopropionic acid,
85.0 g of 1-methoxy propanol-2 and
0.4 g of Cr(III) 2-ethylhexanoate.

The dropping funnel was filled with a homogenous mixture of:
30.4 g of acrylic acid,
44.0 g of styrene,
63.4 g of the glycidyl ester and
2.2 g of dicumyl peroxide After the cooling of the contents of the reaction flask to 95° C., 15.1 g of dimethylethanolamine were added after which, over a period of two hours, 500 g of demineralized water were also added.

EXAMPLE 4

Example 1 was repeated in its entirety except for the following.

In the reaction flask were homogenously mixed:
153.7 g of the dimerized fatty acid, 116.9 g of the epoxy resin,
9.4 g of 3-mercaptopropionic acid,
87.2 g of 1-methoxy propanol-2 and
0.4 g of Cr(III) 2-ethylhexanoate.

The dropping funnel was filled with a homogenous mixture of:
26.1 g of acrylic acid,
37.7 g of styrene,
54.4 g of the glycidyl ester and
1.8 g of dicumyl peroxide.

After the cooling of the contents of the reaction flask to 95° C., 12.9 g of dimethylethanolamine were added after which, over a period of two hours, 500 g of demineralized water were also added.

EXAMPLE 5

Example 1 was repeated in its entirety except for the following.

In the reaction flask were homogenously mixed:
124.0 g of the dimerized fatty acid,
91.0 g of the epoxy resin,
2.9 g of 3-mercaptopropionic acid,
3.3 g of benzoic acid
80.8 g of 1-methoxy propanol-2 and
0.3 g of Cr(III) 2-ethylhexanoate.

The dropping funnel was filled with a homogenous mixture of:
38.8 g of acrylic acid,
56.1 g of styrene,
80.9 g of the glycidyl ester and
2.7 g of dicumyl peroxide.

After ventilating, the reaction flask and dropping funnel were brought under a nitrogen atmosphere. The contents of the reaction flask were then heated to reflux (about 130° C.–140° C.) and maintained at reflux for 3 hours, after which the contents of the dropping funnel were added. The temperature of the reaction mixture was maintained at 130° C. for three hours, and increased to 140° C. for one additional hour.

The contents of the reaction flask were then cooled to 95° C. and 19.2 g of dimethylethanolamine added after which, over a period of two hours, 611 g of demineralized water were also added.

EXAMPLE 6

Example 5 was repeated in its entirety except for the following.

In the reaction flask were homogenously mixed:
123.4 g of the dimerized fatty acid,
90.5 g of the epoxy resin,
2.8 g of 3-mercaptopropionic acid,
3.3 g of benzoic acid,
75.8 g of 1-methoxy propanol-2,
8.0 g of methylisobutylketone and
0.3 g of Cr(III) 2-ethylhexanoate.
The dropping funnel was filled with a homogenous mixture of:
37.6 g of acrylic acid,
54.4 g of styrene,
84.9 g of the glycidyl ester and
3.1 g of dicumyl peroxide.

After the cooling of the contents of the reaction flask to 95° C., 16.3 g of dimethylethanolamine were added after which, over a period of two hours, 712 g of demineralized water were also added.

EXAMPLE 7

Example 5 was repeated in its entirety except for the following.

The dropping funnel was filled with a homogenous mixture of:
37.7 g of acrylic acid,
10.5 g of methyl methacrylate,
43.5 g of styrene,
85.1 g of the glycidyl ester and
3.2 g of dicumyl peroxide.

After the cooling of the contents of the reaction flask to 95° C., 16.3 g of dimethylethanolamine were added after which, over a period of two hours, 643 g of demineralized water were also added.

EXAMPLE 8

Example 5 was repeated in its entirety except for the following.

In the reaction flask were homogenously mixed:
134.6 g of the dimerized fatty acid,
98.7 g of the epoxy resin,
3.1 g of 3-mercaptopropionic acid,
3.6 g of benzoic acid,
77.6 g of 1-methoxy propanol-2,
8.0 g of methyl isobutyl ketone and
0.4 g of Cr(III) 2-ethylhexanoate.
The dropping funnel was filled with a homogenous mixture of:
33.6 g of acrylic acid,
9.3 g of methyl methacrylate,
38.7 g of styrene,
75.6 g of the glycidyl ester and
2.8 g of dicumyl peroxide.

After the cooling of the contents of the reaction flask to 95° C., 14.5 g of dimethylethanolamine were added after which, over a period of two hours, 526 g of demineralized water were also added.

EXAMPLE 9

Example 5 was repeated in its entirety except for the following.

In the reaction flask were homogenously mixed:
145.8 g of the dimerized fatty acid,
107.0 g of the epoxy resin,
3.3 g of 3-mercaptopropionic acid,
3.9 g of benzoic acid,
79.4 g of 1-methoxy propanol-2,
8.0 g of methyl isobutyl ketone and
0.3 g of Cr(III) 2-ethylhexanoate.
The dropping funnel was filled with a homogenous mixture of:
29.3 g of acrylic acid,
8.1 g of methyl methacrylate,
33.9 g of styrene,
66.2 g of the glycidyl ester and
2.5 g of dicumyl peroxide.

After the cooling of the contents of the reaction flask to 95° C., 12.7 g of dimethylethanolamine were added after which, over a period of two hours, 500 g of demineralized water were also added.

EXAMPLE 10

Example 5 was repeated in its entirety except for the following.

In the reaction flask were homogenously mixed:
157.0 g of the dimerized fatty acid,
115.2 g of the epoxy resin, 3.6 g of 3-mercaptopropionic acid,
4.2 g of benzoic acid,
81.2 g of 1-methoxy propanol-2,
8.0 g of methyl isobutyl ketone and
0.4 g of Cr(III) 2-ethylhexanoate.
The dropping funnel was filled with a homogenous mixture of:
25.1 g of acrylic acid,
7.0 g of methyl methacrylate,
29.1 g of styrene,
56.7 g of the glycidyl ester and
2.1 g of dicumyl peroxide.

After the cooling of the contents of the reaction flask to 95° C., 10.9 g of dimethylethanolamine were added after which, over a period of two hours, 452 g of demineralized water were also added.

EXAMPLE 11

Example 10 was repeated in its entirety except for the following.
The dropping funnel was filled with a homogenous mixture of:
15.4 g of acrylic acid,
12.2 g of methacrylic acid,
7.1 g of methyl methacrylate,
29.65 g of styrene,
53.55 g of the glycidyl ester and
2.10 g of dicumyl peroxide.

After the cooling of the contents of the reaction flask to 95° C., 11.4 g of dimethylethanolamine were added after which, over a period of two hours, 430 g of demineralized water were also added.

EXAMPLE 12

Example 5 was repeated in its entirety except for the following.
In the reaction flask were homogenously mixed:
168.2 g of the dimerized fatty acid,
123.4 g of the epoxy resin,
3.9 g of 3-mercaptopropionic acid,
4.5 g of benzoic acid,
83.0 g of 1-methoxy propanol-2,
8.0 g of methyl isobutyl ketone and
0.5 g of Cr(III) 2-ethylhexanoate.
The dropping funnel was filled with a homogenous mixture of:
20.95 g of acrylic acid,
5.80 g of methyl methacrylate,
24.20 g of styrene,
47.30 g of the glycidyl ester and
1.75 g of dicumyl peroxide.

After the cooling of the contents of the reaction flask to 95° C., 9.1 g of dimethylethanolamine were added after which, over a period of two hours, 351 g of demineralized water were also added.

EXAMPLE 13

Example 12 was repeated in its entirety except for the following.
The dropping funnel was filled with a homogenous mixture of:
12.80 g of acrylic acid,
10.20 g of methylacrylic acid,
5.95 g of methyl methacrylate,
24.70 g of styrene,
44.55 g of the glycidyl ester and
1.80 g of dicumyl peroxide.

After the cooling of the contents of the reaction flask to 95° C., 9.5 g of dimethylethanolamine were added after which, over a period of two hours, 351 g of demineralized water were also added.

EXAMPLE 14

Example 5 was repeated in its entirety except for the following.
In the reaction flask were homogenously mixed:
179.4 g of the dimerized fatty acid,
131.7 g of the epoxy resin,
4.1 g of 3-mercaptopropionic acid,
4.8 g of benzoic acid,
84.8 g of 1-methoxy propanol-2,
8.0 g of methyl isobutyl ketone and
0.5 g of Cr(III) 2-ethylhexanoate.
The dropping funnel was filled with a homogenous mixture of
16.8 g of acrylic acid,
4.7 g of methyl methacrylate,
19.3 g of styrene,
37.8 g of the glycidyl ester and
1.4 g of dicumyl peroxide.

After the cooling of the contents of the reaction flask to 95° C., 7.3 g of dimethylethanolamine were added after which, over a period of two hours, 300 g of demineralized water were also added.

EXAMPLE 15

Example 14 was repeated in its entirety except for the following.
The dropping funnel was filled with a homogenous mixture of:
10.25 g of acrylic acid,
8.15 g of methacrylic acid,
4.75 g of methyl methacrylate,
19.80 g of styrene,
35.65 g of the glycidyl ester and
1.40 g of dicumyl peroxide.

After the cooling of the contents of the reaction flask to 95° C., 7.6 g of dimethylethanolamine were added after which, over a period of two hours, 300 g of demineralized water were also added.

EXAMPLE 16

Example 5 was repeated in its entirety except for the following.
In the reaction flask were homogenously mixed:
190.7 g of the dimerized fatty acid,
139.9 g of the epoxy resin,
4.4 g of 3-mercaptopropionic acid,
5.0 g of benzoic acid,
86.7 g of 1-methoxy propanol-2,
8.0 g of methyl isobutyl ketone and
0.5 g of Cr(III) 2-ethylhexanoate.
The dropping funnel was filled with a homogenous mixture of:
12.60 g of acrylic acid,
3.50 g of methyl methacrylate,
14.50 g of styrene,
28.35 g of the glycidyl ester and
1.05 g of dicumyl peroxide.

After the cooling of the contents of the reaction flask to 95° C., 5.4 g of dimethylethanolamine were added after which, over a period of two hours, 284.7 g of demineralized water were also added.

EXAMPLE 17

Example 5 was repeated in its entirety except for the following.

In the reaction flask were homogenously mixed:
260.8 g of the dimerized fatty acid,
191.3 g of the epoxy resin,
6.0 g of 3-mercaptopropionic acid,
6.9 g of benzoic acid,
125.3 g of 1-methoxy propanol-2,
12.0 g of methyl isobutyl ketone and
0.6 g of Cr(III) 2-ethylhexanoate.

The dropping funnel was filled with a homogenous mixture of:
17.30 g of acrylic acid,
13.80 g of methacrylic acid,
8.00 g of methyl methacrylate,
33.35 g of styrene,
60.15 g of the glycidyl ester and
2.40 g of dicumyl peroxide.

After the cooling of the contents of the reaction flask to 95° C., 12.85 g of dimethylethanolamine were added after which, over a period of two hours, 500 g of demineralized water were also added.

EXAMPLE 18

In a 2 liter reaction flask fitted with a stirrer, a thermometer, a reflux condenser and a dropping funnel were homogenously mixed:
126.4 g of a dimerized fatty acid of Example 1,
68.4 g of a 3,4-epoxycyclohexylmethyl-3,4-epoxycyclohexyl carboxylate (commercially available under the trade designation Araldite CY-179 from Ciba-Geigy),
5.2 g of 3-mercaptopropionic acid,
40.0 g of methyl isobutyl ketone and
0.4 g of Cr(III) 2-ethylhexanoate.

The dropping funnel was filled with a homogenous mixture of:
75.5 g of styrene,
51.5 g of butyl methacrylate,
36.3 g of methyl methacrylate,
31.2 g of methacrylic acid,
5.5 g of dicumyl peroxide and
60.0 g of dipropylene glycol monoisopropyl ether.

After ventilating, the reaction flask and dropping funnel were brought under a nitrogen atmosphere. The contents of the reaction flask were then heated to 100° C. and maintained at that temperature for 4 hours, after which the contents of the dropping funnel were added. The temperature of the reaction mixture was then brought to 130° C., and this temperature maintained for another four hours.

The contents of the reaction flask were then cooled to 100° C. and 25.8 g of dimethylethanolamine added after which, over a period of two hours, 808 g of demineralized water were also added.

EXAMPLE 19

In a 2 liter reaction flask fitted with a stirrer, a thermometer, a reflux condenser and two dropping funnels (A and B) were homogenously mixed:
138.80 g of the dimerized fatty acid of Example 1,
75.10 g of the epoxy resin of Example 18,
3.25 g of benzoic acid,
33.00 g of 1-methoxy propanol-2 and
0.40 g of Cr(III) 2-ethylhexanoate.

Dropping funnel A was filled with a homogenous mixture of:
2.85 g of 3-mercaptopropionic acid and
10.00 g of methyl isobutyl ketone,
and dropping funnel B was filled with a homogenous mixture of:
64.2 g of styrene,
69.1 g of butyl acrylate,
22.2 g of 2-hydroxypropyl methacrylate,
19.9 g of methacrylic acid,
4.6 g of dicumyl peroxide and
40.0 g of 1-methoxy propanol-2.

After ventilating, the reaction flask and dropping funnel were brought under a nitrogen atmosphere. The contents of the reaction flask were then heated to 100° C. and maintained at that temperature for 2 hours, after which the contents of the dropping funnel A were added and the reaction mixture maintained at 100° C. for another two hours. The contents of dropping funnel B were then added, and the temperature of the reaction mixture raised to 125° C. and maintained at that temperature for four hours.

The contents of the reaction flask were then cooled to 100° C. and 16.5 g of dimethylethanolamine added after which, over a period of two hours, 791 g of demineralized water were also added.

EXAMPLE 20

Example 19 was repeated in its entirety except for the following.

In the reaction flask were homogenously mixed:
126.15 g of the dimerized fatty acid,
68.25 g of the epoxy resin,
3.00 g of benzoic acid,
33.00 g of dipropyleneglycol dimethylether and
0.40 g of Cr(III) 2-ethylhexanoate.

Dropping funnel A was filled with a homogenous mixture of:
2.6 g of 3-mercaptopropionic acid and
7.0 g of dipropylene glycol dimethyl ether, and
dropping funnel B was filled with a homogenous mixture of:
72.55 g of styrene,
98.22 g of butyl acrylate,
24.00 g of methacrylic acid,
5.23 g of dicumyl peroxide and
60.00 g of dipropylene glycol dimethyl ether.

After the cooling of the contents of the reaction flask to 100° C., 19.9 g of dimethylethanolamine were added after which, over a period of two hours, 731 g of demineralized water were also added.

EXAMPLE 21

Example 19 was repeated in its entirety except for the following.

In the reaction flask were homogenously mixed:
176.99 g of the dimerized fatty acid,
95.76 g of the epoxy resin,
16.00 g of methyl ethyl ketone,
20.00 g of 1-methoxy propanol-2 and
0.40 g of Cr(III) 2-ethylhexanoate.

Dropping funnel A was filled with a homogenous mixture of:
7.25 g of 3-mercaptopropionic acid and
8.00 g of 1-methoxy propanol-2,
and dropping funnel B was filled with a homogenous mixture of:
25.1 g of acrylic acid, 7.0 g of methyl methacrylate,
29.1 g of styrene,
56.7 g of the glycidyl ester of Example 1,
2.1 g of dicumyl peroxide and
45.2 g of 1-methoxy propanol-2.

After the cooling of the contents of the reaction flask to 100° C., 10.9 g of dimethylethanolamine were added after which, over a period of two hours, 591 g of demineralized water were also added.

EXAMPLE 22

Example 19 was repeated in its entirety except for the following.

In the reaction flask were homogenously mixed:
177.94 g of the dimerized fatty acid,
94.22 g of the epoxy resin,
4.20 g of benzoic acid,
16.00 g of methyl ethyl ketone,
20.00 g of 1-methoxy propanol-2 and
0.40 g of Cr(III) 2-ethylhexanoate.
Dropping funnel A was filled with a homogenous mixture of:
3.64 g of 3-mercaptopropionic acid and
8.00 g of 1-methoxy propanol-2,
and dropping funnel B was filled with a homogenous mixture of:
25.1 g of acrylic acid,
7.0 g of methyl methacrylate,
29.1 g of styrene,
56.7 g of the glycidyl ester,
2.1 g of dicumyl peroxide and
45.2 g of 1-methoxy propanol-2.

After the cooling of the contents of the reaction flask to 100° C., 10.9 g of dimethylethanolamine were added after which, over a period of two hours, 553 g of demineralized water were also added.

EXAMPLE 23

Example 19 was repeated in its entirety except for the following.

In the reaction flask were homogenously mixed:
267.18 g of the dimerized fatty acid,
141.46 g of the epoxy resin,
3.15 g of benzoic acid,
30.00 g of propylene glycol dimethyl ether,
26.24 g of dipropylene glycol dimethyl ether and
0.63 g of Cr(III) 2-ethylhexanoate.
Dropping funnel A was filled with a homogenous mixture of:
8.21 g of 3-mercaptopropionic acid and
17.25 g of dipropylene glycol dimethyl ether,
and dropping funnel B was filled with a homogenous mixture of:
37.65 g of acrylic acid,
10.50 g of methyl methacrylate,
43.65 g of styrene,
85.05 g of the glycidyl ester,
3.15 g of dicumyl peroxide and
60.33 g of dipropylene glycol dimethyl ether.

After the cooling of the contents of the reaction flask to 100° C., 16.34 g of dimethylethanolamine were added after which, over a period of two hours, 641 g of demineralized water were also added.

TABLE I

Properties of the Aqueous Polymer Dispersions

| Dispersion of Example | Solids Content (wt %) | Viscosity (Pa · s.) | pH | Mean Particle (Size (nm) |
|---|---|---|---|---|
| 1 | 37 | 0.60 | 8.1 | 89 |
| 2 | 40 | 0.12 | 8.2 | 68 |
| 3 | 39 | 0.60 | 8.1 | 115 |
| 4 | 40 | 0.14 | 8.1 | 128 |
| 5 | 35 | 0.63 | 8.6 | 113 |
| 6 | 32 | 0.60 | 8.5 | 63 |
| 7 | 34 | 0.73 | 8.4 | 74 |
| 8 | 39 | 2.40 | 8.4 | 99 |
| 9 | 40 | 0.66 | 8.2 | 102 |
| 10 | 42 | 0.52 | 8.2 | 120 |
| 11 | 43 | 0.36 | 8.3 | 159 |
| 12 | 47 | 0.70 | 8.0 | 187 |
| 13 | 47 | 0.96 | 8.2 | 186 |
| 14 | 50 | 0.53 | 8.1 | 242 |
| 15 | 50 | 0.60 | 8.1 | 238 |
| 16 | 51 | 0.24 | 8.1 | 310 |
| 17 | 48 | 0.62 | 8.2 | 209 |
| 18 | 30 | 1.87 | 8.6 | 33 |
| 19 | 31 | 0.53 | 8.6 | 48 |
| 20 | 32 | 0.33 | 8.9 | 89 |
| 21 | 37 | 1.00 | 7.9 | 72 |
| 22 | 38 | 0.78 | 8.1 | 136 |
| 23 | 43 | 0.53 | 7.8 | 136 |

COMPARATIVE EXAMPLE 1

Example 10 was repeated in its entirety except for the following.

In the reaction flask were homogenously mixed:
156.4 g of the dimerized fatty acid,
114.8 g of the epoxy resin,
4.6 g of dimethylolpropionic acid,
4.2 g of benzoic acid,
81.2 g of 1-methoxy propanol-2,
8.0 g of methyl isobutyl ketone and
0.4 g of Cr(III) 2-ethylhexanoate.

The resulting aqueous dispersion was unstable as phase separation occurred.

COMPARATIVE EXAMPLE 2

Example 10 was repeated in its entirety except for the following.

In the reaction flask were homogenously mixed:
157.6 g of the dimerized fatty acid,
115.7 g of the epoxy resin,
2.5 g of propionic acid,
4.2 g of benzoic acid,
81.2 g of 1-methoxy propanol-2,
8.0 g of methyl isobutyl ketone and
0.4 g of Cr(III) 2-ethylhexanoate.

The resulting aqueous dispersion was unstable as phase separation occurred.

Preparation of Coating Compositions

In the following Examples 24–48, a number of unpigmented (Examples 24–46) and pigmented (Examples 47–48) coating compositions in accordance with the present invention were prepared by homogenously mixing the dispersion, melamine hardener, optionally demineralized water and optionally titanium dioxide (pigment) as set forth in Table II.

The melamine hardener used in these Examples 24–48 was a 90% solids melamine resin commercially available under the trade designation Cymel 327 from American Cyanamid.

The demineralized water was added to adjust the coating compositions to a spray viscosity of about 0.1 Pa.sec. (runout viscosity of 30 sec. in a Ford Cup No. 4).

The solids contents of these coating compositions were measured in the same manner as described above for the dispersions, and the results are also presented in Table II.

Each of these coating compositions was applied onto a zinc phosphate pretreated steel panel (Bonder 132) and cured in a baking oven for 30 minutes at a temperature of 140° C. Various properties of the so-obtained coatings were measured, and the results are presented below in Table III.

The Persoz hardness was determined in accordance with French industrial standard NF T30-016, and the results are expressed in seconds. An acceptable minimum for automotive paint is about 180 seconds.

The flexibility of the coatings was determined with a ball impact tester in accordance with ASTM D2794-69 using a ball weight of 0.908 kg, a ball diameter of 15.9 mm and an aperture of 16.3 mm, the results being expressed in kg.cm. An acceptable minimum flexibility for the coat side is about 35 kg.cm, with the maximum measurable value being 85 kg.cm.

The coatings were also tested via the Erichsen indentation test with the results being expressed in mm. A test value of higher than 6 is indicative of a flexible coating, and a value of 2 a brittle coating.

The gloss of the coating was determined in accordance with U.S. industrial standard ASTM D-523 at 60° and 20°. A gloss value on a steel substrate of above 80 at 60° is considered high.

TABLE II

Coating Composition Formulations

| Example | Dispersion | Dispersion (grams) | Hardener (grams) | Water (grams) | Titan. Diox. (grams) | Solids Content (wt %) |
|---|---|---|---|---|---|---|
| 24 | Ex. 1 | 100.0 | 10.2 | 7.0 | — | 36.8 |
| 25 | Ex. 2 | 100.0 | 14.6 | 2.0 | — | 43.0 |
| 26 | Ex. 3 | 100.0 | 14.3 | 6.0 | — | 38.7 |
| 27 | Ex. 4 | 100.0 | 14.6 | 3.0 | — | 39.5 |
| 28 | Ex. 5 | 100.0 | 12.7 | 8.0 | — | 35.5 |
| 29 | Ex. 6 | 100.0 | 11.7 | 2.0 | — | 35.8 |
| 30 | Ex. 7 | 100.0 | 12.5 | 3.4 | — | 36.5 |
| 31 | Ex. 8 | 100.0 | 14.3 | 6.5 | — | 39.3 |
| 32 | Ex. 9 | 100.0 | 14.6 | 4.0 | — | 41.0 |
| 33 | Ex. 10 | 100.0 | 15.4 | 3.3 | — | 43.1 |
| 34 | Ex. 11 | 100.0 | 15.7 | 4.0 | — | 44.5 |
| 35 | Ex. 12 | 100.0 | 17.1 | 4.5 | — | 47.1 |
| 36 | Ex. 13 | 100.0 | 17.3 | 7.0 | — | 46.6 |
| 37 | Ex. 14 | 100.0 | 18.4 | 4.0 | — | 50.2 |
| 38 | Ex. 15 | 100.0 | 18.5 | 6.0 | — | 49.7 |
| 39 | Ex. 16 | 100.0 | 18.7 | 3.3 | — | 51.5 |
| 40 | Ex. 17 | 100.0 | 17.7 | 5.0 | — | 48.2 |
| 41 | Ex. 18 | 100.0 | 11.1 | 8.0 | — | 32.7 |
| 42 | Ex. 19 | 100.0 | 11.5 | 2.0 | — | 34.4 |
| 43 | Ex. 20 | 100.0 | 11.9 | — | — | 35.8 |
| 44 | Ex. 21 | 100.0 | 13.6 | 2.9 | — | 39.4 |
| 45 | Ex. 22 | 100.0 | 13.8 | 3.0 | — | 39.3 |
| 46 | Ex. 23 | 100.0 | 20.5 | 3.7 | — | 44.3 |
| 47 | Ex. 10 | 100.0 | 15.4 | 1.0 | 55.5 | 55.6 |
| 48 | Ex. 12 | 100.0 | 17.1 | 4.0 | 61.5 | 58.5 |

TABLE III

Properties of the Coatings

| Coating of Example | Coating Thick. (μm) | Persoz Hard (sec) | Flexibility (kg. cm) Coated Side | Flexibility (kg. cm) Back Side | Erichsen Indent. (mm) | Gloss 60° | Gloss 20° |
|---|---|---|---|---|---|---|---|
| 24 | 40 | 211 | >85 | 76 | 8.3 | 102 | 89 |
| 25 | 36 | 270 | 56 | 28 | 6.8 | 100 | 80 |
| 26 | 43 | 250 | 76 | 66 | 7.9 | 102 | 85 |
| 27 | 36 | 252 | >85 | 80 | 7.8 | 102 | 86 |
| 28 | 40 | 274 | 82 | 68 | 8.0 | 102 | 89 |
| 29 | 40 | 293 | 42 | 10 | 6.5 | 100 | 82 |
| 30 | 42 | 287 | 46 | 16 | 7.3 | 98 | 83 |
| 31 | 42 | 278 | 50 | 22 | 7.3 | 99 | 84 |
| 32 | 41 | 272 | 64 | 28 | 8.1 | 99 | 86 |
| 33 | 39 | 270 | 68 | 54 | 7.7 | 98 | 86 |
| 34 | 46 | 263 | >85 | 85 | 8.5 | 100 | 88 |
| 35 | 40 | 260 | 82 | 74 | 7.9 | 99 | 84 |
| 36 | 40 | 270 | >85 | 85 | 9.1 | 99 | 84 |
| 37 | 37 | 260 | >85 | 85 | 7.9 | 99 | 83 |
| 38 | 39 | 265 | >85 | 85 | 9.0 | 98 | 83 |
| 39 | 36 | 268 | >85 | 85 | 7.9 | 97 | 66 |
| 40 | 39 | 264 | >85 | 85 | 8.9 | 98 | 83 |
| 41 | 43 | 330 | 35 | 10 | 7.4 | 97 | 80 |
| 42 | 46 | 296 | 44 | 32 | 8.0 | 98 | 84 |
| 43 | 39 | 278 | 71 | 57 | 8.5 | 96 | 78 |
| 44 | 47 | 265 | >85 | 85 | 7.9 | 94 | 77 |
| 45 | 42 | 259 | 77 | 37 | 7.5 | 93 | 70 |
| 46 | 39 | 292 | >85 | 39 | 6.2 | 93 | 80 |
| 47 | 39 | 265 | 62 | 50 | 7.6 | 91 | 79 |
| 48 | 40 | 254 | 80 | 70 | 7.8 | 91 | 78 |

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. A hybrid polymer which comprises
(A) a polymer (core) comprising a mercapto-functionalized poly(epoxyester), which is the reaction product of
   (1) an epoxy-terminated poly(epoxyester) and
   (2) a compound containing
      (a) a primary mercapto group and (b) a group more reactive with an epoxy group than is a primary mercapto group;
onto which has been grafted, via the addition polymerization of free-radically polymerizable monomers in the presence of the mercapto-functionalized poly(epoxyester), (B) at least one addition polymer-based chain (shell), the addition polymer-based chain having an acid number of from about 20 to about 100.

2. The hybrid polymer of claim 1, wherein the hybrid polymer comprises from about 40 weight percent to about 90 weight percent of the polymer (A) and from about 10 weight percent to about 60 weight percent of the addition polymer-based chains (B), based upon the total weight of the hybrid polymer.

3. The hybrid polymer of claim 1, wherein the epoxy-terminated poly(epoxyester) comprises the reaction product of
n moles of a bisepoxide having a number average molecular weight (Mn) in the range of from about 150 to about 2000, and
n−1 moles of a dicarboxylic acid having 4-40 carbon atoms, wherein n=2-10.

4. The hybrid polymer of claim 3, wherein the poly(epoxyester) has an Mn in the range of from about 400 to about 20,000.

5. The hybrid polymer of claim 3, wherein the bisepoxide is selected from the group consisting of diglycidyl ethers of bisphenol A and epoxy oligomers from epichlorohydrin and bisphenol A.

6. The hybrid polymer of claim 3, wherein the dicarboxylic acid is a dimerized fatty acid.

7. The hybrid polymer of claim 1, wherein the primary mercapto group-containing compound is a compound of the general formula (I), HS—R—X  (I)

wherein R is a hydrocarbon group having from 1 to 24 carbon atoms, and X is the group more reactive with an epoxy group than is a primary mercapto group.

8. The hybrid polymer of claim 7, wherein R is an alkylene group having from 1 to 11 carbon atoms, and X is an amino or carboxyl group.

9. The hybrid polymer of claim 7, wherein the primary mercapto group-containing compound comprises a mercaptomonocarboxylic acid.

10. The hybrid polymer of claim 7, wherein a portion of the primary mercapto group-containing compound is replaced with a monofuctional compound of the general formula (II):

R₁—X₁  (II), wherein R₁ is a hydrocarbon group having from 1 to 40 carbon atoms, and X₁ is a functional group which is more reactive with an epoxy group than is a primary mercapto group.

11. The hybrid polymer of claim 10, wherein R₁ is an alkyl, aralkyl, aryl or cycloalkyl group having from 1 to 24 carbon atoms, and X₁ is an amino or carboxyl group.

12. The hybrid polymer of claim 11, wherein the monofunctional compound comprises a monocarboxylic acid.

13. The hybrid polymer of claim 10, wherein the primary mercapto group-containing compound is utilized in an equivalence ratio of X groups to epoxy groups of at least about 1:4.

14. The hybrid polymer of claim 13, wherein the primary mercapto group-containing compound is utilized in an equivalence ratio of X groups to epoxy groups of at least about 1:2.

15. The hybrid polymer of claim 13, wherein the combination of the primary mercapto group-containing compound and monofunctional compound is utilized in an equivalence ratio of X+X₁ groups to epoxy groups of from about 1:4 to 1:1.

16. The hybrid polymer of claim 1, wherein the addition polymer-based chains are produced from a monomer mixture comprising
35-55 mol percent of styrene and/or α-methylstyrene;
20-50 mol percent of a compound of the general formula (III):

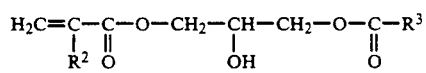

wherein
R² is an H atom or a methyl group, and
R³ is an alkyl group with 4-10 carbon atoms; and
0-30 mol percent of one or more other free-radically polymerizable monomers.

17. The hybrid polymer of claim 1, wherein the addition polymer-based chains are produced from a monomer mixture comprising
35-55 mol % of styrene and/or α-methyl styrene;
20-50 mol % of acrylic acid and/or methacrylic acid; and
0-30 mol % of one or more other free-radically polymerizable monomers,
wherein the reaction product during or after the polymerization is reacted with a glycidyl ester of a carboxylic acid, having the general formula (IV)

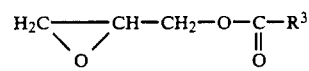

wherein R³ is an alkyl group with 4-10 carbon atoms.

18. The hybrid polymer of claim 1, wherein acid groups of the hybrid polymer have been at least partially neutralized.

19. An aqueous dispersion comprising the at least partially neutralized hybrid polymer of claim 18.

20. An aqueous coating composition comprising the aqueous dispersion of claim 19.

21. The aqueous coating composition of claim 20, further comprising an hydroxyl group-reactive curing agent.

22. An aqueous dispersion comprising an at least partially-neutralized hybrid polymer which consists essentially of
(A) a polymer (core) comprising a mercapto-functionalized poly(epoxyester), which is the reaction product of
(1) an epoxy-terminated poly(epoxyester) and
(2) a compound containing
    (a) a primary mercapto group and
    (b) a group more reactive with an epoxy group than is a primary mercapto group;
onto which has been grafted, via the addition polymerization of free-radically polymerizable monomers in the presence of the mercapto-functionalized poly(epoxyester), (B) at least one addition polymer-based chain (shell), the addition polymer-based chain having an acid number of from about 20 to about 100, wherein said hybrid polymer contains from about 40 weight percent to about 90 weight percent of the polymer (A) and from about 10 weight percent to about 60 weight percent of the addition polymer-based chains (B), based upon the total weight of the hybrid polymer.

23. An aqueous coating composition comprising an aqueous dispersion of an at least partially-neutralized hybrid polymer in combination with a hydroxyl group-reactive curing agent, wherein said hybrid polymer consists essentially of (A) a polymer (core) comprising a mercapto-functionalized poly(epoxyester), which is the reaction product of
 (1) an epoxy-terminated poly(epoxyester) and
 (2) a compound containing
  (a) a primary mercapto group and
  (b) a group more reactive with an epoxy group than is a primary mercapto group;
onto which has been grafted, via the addition polymerization of free-radically polymerizable monomers in the presence of the mercapto-functionalized poly(epoxyester), (B) at least one addition polymer-based chain (shell), the addition polymer-based chain having an acid number of from about 20 to about 100, and wherein said hybrid polymer comprises from about 40 weight percent to about 90 weight percent of the polymer (A) and from about 10 weight percent to about 60 weight percent of the addition polymer-based chains (B), based upon the total weight of the hybrid polymer.

* * * * *

UNITED STATES PATENT AND TRADEMARK OFFICE
CERTIFICATE OF CORRECTION

PATENT NO. : 5,190,994
DATED : March 2, 1993
INVENTOR(S) : Buter, Roelof, et al.

It is certified that error appears in the above—identified patent and that said Letters Patent is hereby corrected as shown below:

Column 5, Table III should read:

Column 1, line 54, please change "chemicial" to -- chemical --;

Column 19, line 52, please change "monofuctional" to -- monofunctional --; and

Column 20, line 32, please change "methyl styrene" to -- methylstyrene --.

Signed and Sealed this

Fifth Day of April, 1994

Attest:

BRUCE LEHMAN

Attesting Officer    Commissioner of Patents and Trademarks